(12) United States Patent
Robbins (10) Patent No.: US 8,749,400 B2
(45) Date of Patent: Jun. 10, 2014

(54) SYMBOL SYNCHRONIZATION FOR DOWNHOLE OFDM TELEMETRY

(75) Inventor: Carl A. Robbins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1612 days.

(21) Appl. No.: 12/193,525

(22) Filed: Aug. 18, 2008

(65) Prior Publication Data

US 2010/0039286 A1 Feb. 18, 2010

(51) Int. Cl.
*H04L 27/28* (2006.01)

(52) U.S. Cl.
USPC .............................. 340/855.7; 375/260

(58) Field of Classification Search
USPC .............. 340/855.7; 375/260, 261, 262, 265; 370/208, 210
See application file for complete search history.

(56) References Cited

U.S. PATENT DOCUMENTS

| | | | |
|---|---|---|---|
| 5,854,991 A | 12/1998 | Gupta et al. | |
| 6,658,063 B1* | 12/2003 | Mizoguchi et al. | 375/260 |
| 6,898,149 B2* | 5/2005 | Hill et al. | 367/82 |
| 7,230,541 B2* | 6/2007 | Ripolone et al. | 340/853.2 |
| 7,457,295 B2* | 11/2008 | Saunders et al. | 370/395.21 |
| 7,856,068 B1* | 12/2010 | Tung et al. | 375/267 |
| 2004/0100939 A1 | 5/2004 | Kriedte et al. | |
| 2004/0142696 A1 | 7/2004 | Saunders et al. | |
| 2004/0156264 A1 | 8/2004 | Gardner et al. | |
| 2006/0044939 A1 | 3/2006 | Shah et al. | |
| 2006/0153283 A1* | 7/2006 | Scharf et al. | 375/148 |
| 2006/0219438 A1 | 10/2006 | Moore et al. | |

FOREIGN PATENT DOCUMENTS

GB 2476885 7/2012

OTHER PUBLICATIONS

PCT Internat'l Search Report and Written Opinion, dated Aug. 12, 2009, Appl No. PCT/US09/047063, "Symbol Synchronization for Downhole OFDM Telemetry", filed Jun. 11, 2009, 11 pgs.
PCT Int'l Preliminary Report on Patentability, dated Mar. 3, 2011, Appl No. PCT/US09/47063, "Symbol Synchronization for Downhole OFDM Telemetry", filed Jun. 11, 2009, 8 pgs.
Tchamkerten, Aslan et al., "On the Use of Training Sequences for Channel Estimation", IEEE Transactions on Information Theory, vol. 52, No. 3, Mar. 2006, pp. 1171-1177On Information Theory, vol. 52, No. 3, Mar. 2006, pp. 1171-1176.
UK Non-Final Office Action, dated Feb. 27, 2012, Appl No. 1102279. 5, "Symbol Synchronization for Downhole OFDM Telemetry", filed Jun. 11, 2009, 3 pgs.

* cited by examiner

*Primary Examiner* — David Andrews
*Assistant Examiner* — Robert E Fuller
(74) *Attorney, Agent, or Firm* — Krueger Iselin LLP; Bradley A. Misley

(57) ABSTRACT

Enhanced symbol synchronization methods suitable for use in narrowband orthogonal frequency division multiplexed (OFDM) telemetry systems. In at least some embodiments, a logging while drilling (LWD) tool assembly communicates with the surface using low frequency electromagnetic (EM) signals. The telemetry transmitter employs OFDM modulation to fully exploit the narrow range of available bandwidth, resulting in signals that have relatively long frames. At the surface a receiver digitizes the receive signal and applies an enhanced symbol synchronization technique to identify frame boundaries before demodulation is attempted. The enhanced symbol synchronization technique employs a pulse train filter to clean up a cyclic prefix correlation signal that otherwise behaves badly in the narrowband regime. The improved timing information from the enhanced symbol synchronization significantly reduces the error rate in the demodulated signal.

20 Claims, 4 Drawing Sheets

SYMBOL SYNCHRONIZATION FOR DOWNHOLE OFDM TELEMETRY

BACKGROUND

Oil field operators demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole. The direct electrical connection between the surface and the sonde provides a large bandwidth for conveying logging information.

In LWD, the drilling assembly includes sensing instruments that measure various parameters as the formation is being penetrated. While LWD techniques allow more contemporaneous, and often more accurate, formation measurements, it is difficult to establish and maintain a direct electrical connection in an LWD environment. Consequently, alternative communication channels are typically employed for obtaining LWD logging information. Contemplated LWD communication channels include mud pulse signaling, through-wall acoustic signaling, and electromagnetic wave signaling. In each of these channels, the useful bandwidth is highly restricted relative to wireline logging. As new tools and measurement techniques are developed the demand for higher information rates continues to increase beyond existing LWD channel capacities.

BRIEF DESCRIPTION OF THE DRAWINGS

A better understanding of the disclosed invention embodiments can be obtained when the following detailed description is considered in conjunction with the attached drawings, in which.

While the invention is susceptible to various modifications and alternative forms, specific embodiments thereof are given by way of example in the drawings and the following description. It should be understood, however, that the drawings and detailed description are not intended to limit the invention to the particular form disclosed, but on the contrary, the intention is to cover all modifications, equivalents and alternatives falling within the spirit and scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct connection, whether the connection is electrical, mechanical, or thermal. Thus, if a first device couples to a second device, that coupling may be through a direct connection or through an indirect connection via other devices and connections.

DETAILED DESCRIPTION

The issues identified in the background are at least partly addressed by the use of narrowband orthogonal frequency division multiplexed (OFDM) telemetry systems. In at least some embodiments, a logging while drilling (LWD) tool assembly communicates with the surface using low frequency electromagnetic (EM) signals. The telemetry transmitter employs OFDM modulation to fully exploit the narrow range of available bandwidth, resulting in signals that have relatively long frames. At the surface a receiver digitizes the receive signal and applies an enhanced symbol synchronization technique to identify frame boundaries at the beginning of the demodulation process. The enhanced symbol synchronization technique employs a pulse train filter to clean up a cyclic prefix correlation signal that otherwise behaves badly in the narrowband regime. The improved timing information from the enhanced symbol synchronization significantly reduces the error rate in the demodulated signal.

In at least one contemplated embodiment, a low bandwidth OFDM receiver includes an analog to digital converter that transforms an analog receive signal into a digital receive signal. A timing acquisition module processes the digital receive signal to obtain a synchronization signal for demarcating symbol boundaries. Subsequent receiver modules can then convert the demarcated symbols into measurement data that can be presented as data logs for a user to view and analyze. As part of its processing, the timing acquisition module performs a pulse train filtering operation to a receive signal correlation signal. The pulse train filtering operation convolves the correlation signal with an impulse response characterized by a sequence of at least eight pulses offset from each other by one frame period. In some particular embodiments, the pulses are triangular, with a pulse width approximately equal to 20% of a cyclic prefix length. The timing acquisition module can also employ an optional pulse shaping operation to enhance the peaks in the correlation signal. The timing acquisition module may further include a timing adaptation module that adjusts the frame period to account for a clock rate difference relative to a transmitter clock rate. Illustratively, the OFDM receive signal can carry data in multiple frequency bins each having a width of no more than one hertz. (Such a receive signal may be suitable for use in an EM telemetry system or an acoustic telemetry system.) The timing acquisition module can be implemented in hardware, firmware, or as a software module running on a general purpose data processing system.

Figures 1, 2, 3:
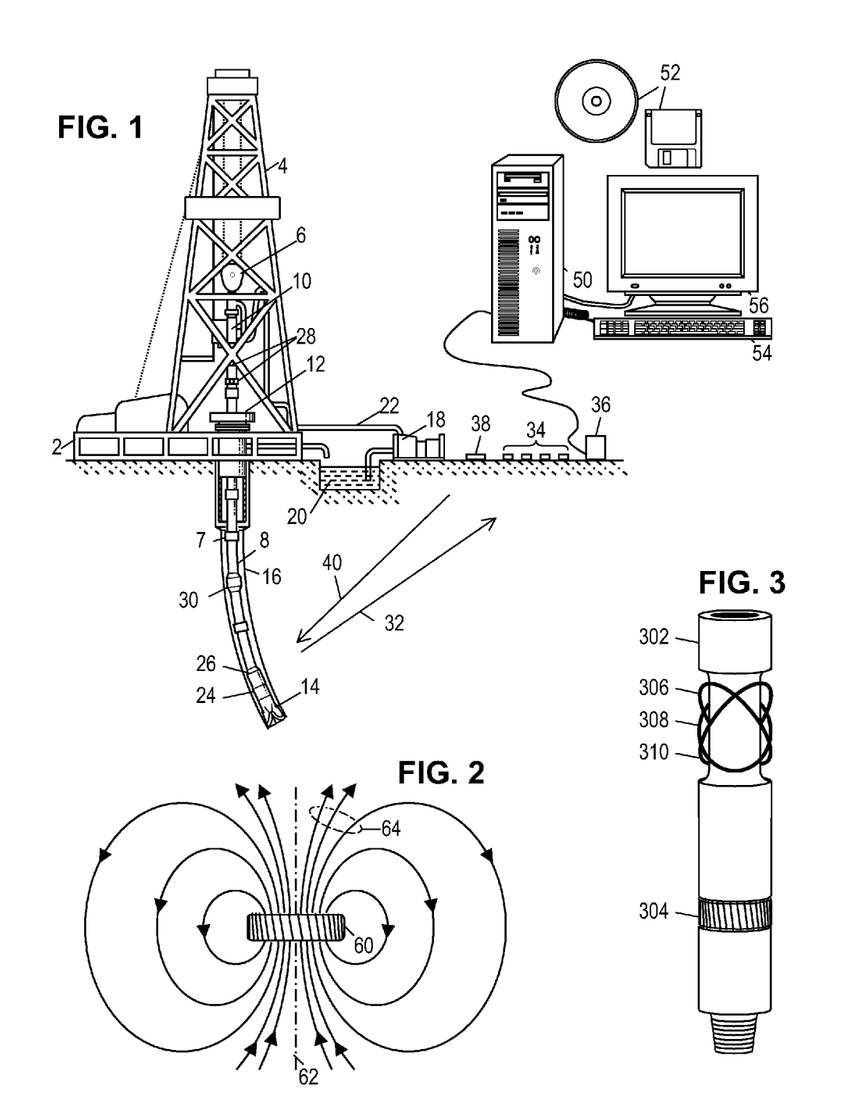
FIG. 1 shows an electromagnetic telemetry system in an illustrative logging while drilling (LWD) environment.
FIG. 2 is a side view of a field pattern for an illustrative electric dipole.
FIG. 3 is a perspective view of an illustrative electromagnetic (EM) telemetry tool.

The disclosed narrowband OFDM telemetry systems and methods are best understood in the context of the larger systems in which they operate. Accordingly, FIG. 1 shows an electromagnetic telemetry system in an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where it is filtered and recirculated.

The drill bit 14 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, a downhole positioning tool 24 includes a 3-axis fluxgate magnetometer and a 3-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes logging instruments to gather measurements of formation properties. Using these measurements in combination with the above-mentioned tool orientation measurements, the driller can steer the drill bit 14 along a desired path using any one of various suitable directional drilling systems, including steering vanes, a "bent sub", and a rotary steerable system. The steering mechanism can be alternatively controlled downhole, with a downhole controller programmed to follow a chosen route.

The bottom-hole assembly still further includes a telemetry transceiver 26 to exchange information with the surface. Two telemetry techniques are illustrated here. Telemetry transceiver 26 may generate acoustic signals that propagate along the walls of the drill string to a set of surface transceivers 28, with optional repeaters 30 provided to boost the signal strength. Conversely, the surface transceivers 28 can generate acoustic signals that propagate in the opposite direction to downhole telemetry transceiver 26. Alternatively, or in addition, telemetry transceiver 26 may generate EM signals 32 that propagate through the formation to a detection array 34 where it is amplified and forwarded to a data acquisition module 36 for capture and preliminary processing. A surface transmitter 38 can generate return EM signals 40 that propagate to the downhole telemetry transceiver 26.

Of course, other suitable telemetry techniques exist and can be used to exchange information between the surface and the bottom-hole assembly. The noted techniques may be particularly noted for imposing narrow bandwidth limits on the communications signals under at least some system configurations. In any event, surface systems can send tool commands and configuration parameters to the bottom-hole assembly, and can receive measurement data (including drilling parameters, tool orientation and position, tool configuration data, and formation measurements) from the bottom-hole assembly. In at least some system embodiments, the uplink signal is provided in the form of a narrowband OFDM modulated signal.

A data acquisition module 36 receives the uplink signal from the EM detection array 34 and/or surface transceivers 28. Module 36 optionally provides some preliminary processing (e.g., beam-forming to enhance signal to noise ratio) and digitizes the signal. A data processing system 50 (shown in FIG. 1 as a desktop computer) receives a digital telemetry signal, demodulates the signal as discussed below, and displays the tool data or well logs to a user. Software (represented in FIG. 1 as information storage media 52) governs the operation of system 50. A user interacts with system 50 and its software 52 via one or more input devices 54 and one or more output devices 56.

Electromagnetic signals 32 and 40 can be transmitted and received using any of many suitable antenna or field sensor configurations. FIG. 2 is a side view of a field pattern for an illustrative electric dipole. In the embodiment of FIG. 2, the dipole takes the form of a toroid 60, i.e., a helical winding around the rim of a circular ferromagnetic core. As alternating current is passed through the electrical conductor, the toroid creates an alternating electrical field pattern in the shape represented by field lines 64. (The field is axially symmetric about axis 62.) When placed around a conductor such as a steel drill collar, the toroid induces current flow parallel to axis 62.

FIG. 3 is a perspective view of an illustrative electromagnetic (EM) telemetry tool 302. Tool 302 may be one of the drill collars 28 in the bottom hole assembly of FIG. 1. A toroid 304 transmits low frequency EM signals by inducing current flows in the body of tool 302. An orthogonal triad of loop antennas 306, 308, 310 is provided to receive EM signals from the surface. Tool 302 may combine the signals from antennas 306-310 so as to synthesize a signal from a virtual antenna that can be "steered" to provide an optimal orientation for receiving.

Figure 4:
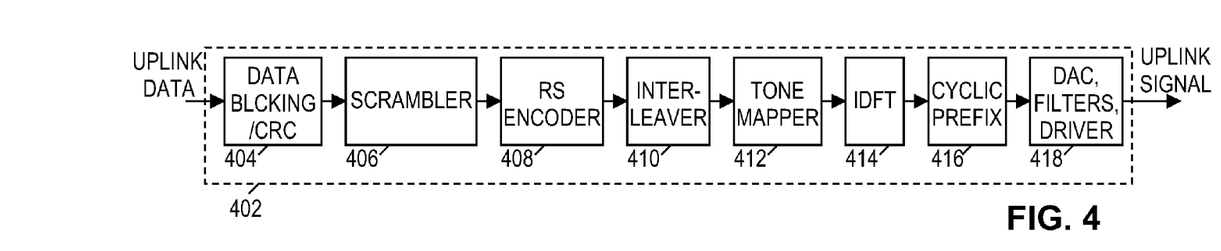
FIG. 4 is a block diagram of an illustrative orthogonal frequency division multiplexing (OFDM) transmitter.

FIG. 4 is a block diagram of an illustrative orthogonal frequency division multiplexing (OFDM) transmitter 402. The embodiment shown depicts the downhole transceiver's ability to transmit data to the surface. The surface equipment may include a similar architecture to transmit information (such as command and configuration signals) to the downhole transceiver. As shown, the transmitter 402 includes a blocking/CRC module 404, a scrambler 406, a Reed-Solomon encoder 408, a data interleaver 410, a tone mapper and constellation encoder 412, an inverse discrete Fourier transform modulator 414, cyclic prefix add logic 416, and a digital-to-analog converter (DAC)/driver module 418. Other arrangements of these components are possible and are within the scope of this disclosure.

The blocking/CRC module 404 arranges the digital data from the sensors into data blocks, which are in turn collected into block groups. The module 404 adds a cyclic redundancy checksum ("CRC") byte to each block or group of blocks. The CRC byte is a checksum value calculated from the contents of the data blocks and provides a mechanism for detecting errors at the receiving end. The data scrambler 406 alters the data bits according to a generator polynomial that produces a pseudo-random mask. The purpose of the scrambler is to flatten the transmitted frequency spectrum and make it independent of the actual data. After scrambling, the Reed-Solomon encoder 408 adds forward error correction data to the block groups for redundancy. At the receiving end, the redundancy can be used to detect and correct errors caused by channel interference. Other error correcting codes can be used in place of the Reed-Solomon code, including other types of block codes or convolutional codes (including turbo codes). Interleaver 410 then interleaves data symbols from the data stream using a convolutional interleaver. This interleaving operation reorders data stream symbols so as to "spread out" previously adjacent symbols. The interleaver 410 works in conjunction with the Reed-Solomon encoder to make it easier to correct "bursty" sequences of errors.

The tone mapper and constellation encoder 412 allocates the input bits among the frequency bins and encodes the bits as phase values. (In some embodiments, the bits are encoded as phase and amplitude values.) In at least some embodiments, the number of frequency bins is configurable, as is the constellation (and hence, the number of bits) used in each frequency bin. The configuration may be determined at start-up and/or adapted to match the channel conditions. Thus, a frequency bin that contains excessive noise or is more attenuated can be configured to carry less information than less noisy or less attenuated bins. The output of the tone mapper and constellation encoder 412 takes the form of N parallel bit streams where N represents the number of frequency bins. After the bits are assigned to each bin, phase-shift key (PSK) constellation encoding takes place. The encoding technique that takes place is unique for each tone (frequency bin). The number of points in each bin's constellation depends on the number of bits assigned to the bin. In accordance with the contemplated embodiment, 2 to 15 bits per bin per data symbol are used.

The output signal from the tone order and constellation encoder 412 comprises multiple frequency coefficients that represent the original information to be transmitted. An inverse discrete Fourier transform modulator 414 converts the frequency coefficients into a digital signal in the time domain. One set of frequency coefficients produces one symbol. The cyclic prefix logic 416 generally duplicates the end portion of the time domain symbol and prepends it to the beginning of the symbol. The cyclic prefix is added in order to enable the frequency domain equalization that occurs in the receiver. Finally, the DAC/driver module 418 converts the digital output of the IDFT modulator (with inserted cyclic prefix) into an analog signal for the transmit antenna. Module 418 may include shaping filters to smooth the signal and shape its spectral content in accordance with known techniques.

Figures 5, 6A:
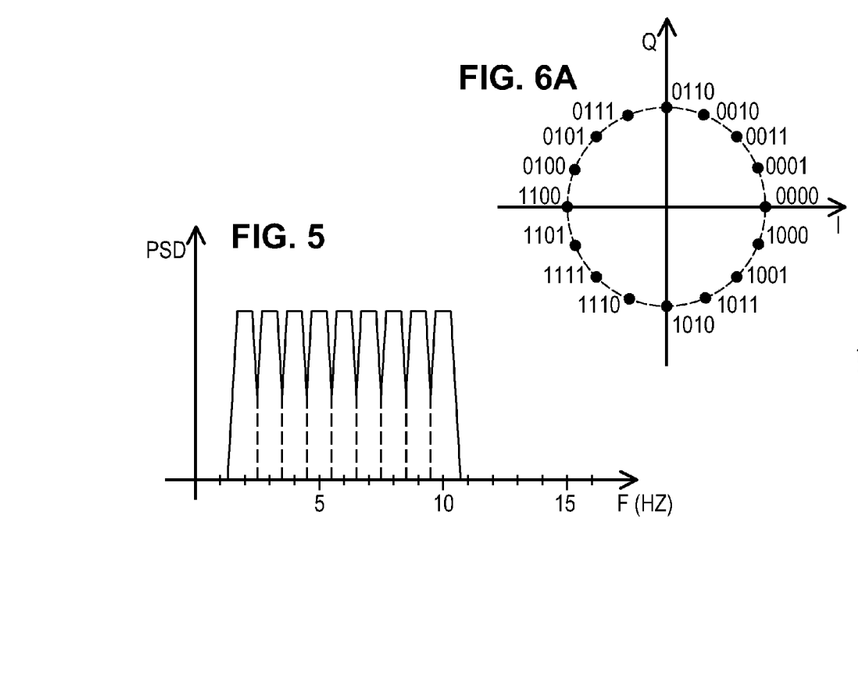
FIG. 5 shows an illustrative power spectral density (PSD) of an OFDM signal.
FIGS. 6A and 6B show illustrative signal constellations.
Figure 6B:
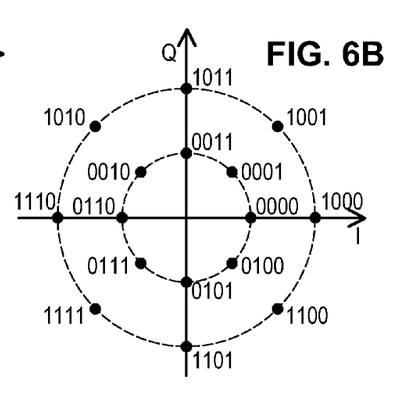

FIG. 5 shows an illustrative power spectral density (PSD) of an OFDM signal. In accordance with at least one contemplated embodiment for an EM telemetry system, the tone mapper provides frequency coefficients for nine frequency bins, the bins being 1 Hz wide and centered at 2, 3, 4, 5, 6, 7, 8, 9, and 10 Hz. In some of the embodiments, the mapper 412 maps the incoming bits to signals in a PSK signal constellation such as that shown in FIG. 6A. The illustrative constellation in FIG. 6A is a 16-PSK constellation with Gray-coded bit labels (i.e., bit assignments that differ by only one bit for adjacent signals), but a greater or lesser number of constellation points may be provided to account for more or fewer bits per frequency bin. We note here that different frequency bins may have different constellations, thereby enabling different numbers of bits to be transported in different bins, sometimes with different immunities to noise. Although PSK modulation is herein deemed particularly beneficial for EM telemetry with OFDM modulation, some contemplated embodiments do support combined amplitude and phase modulation. FIG. 6B is an illustrative 16-point signal constellation having eight signal phases and two signal amplitudes, also with Gray-coded bit labels.

Figures 7, 8:
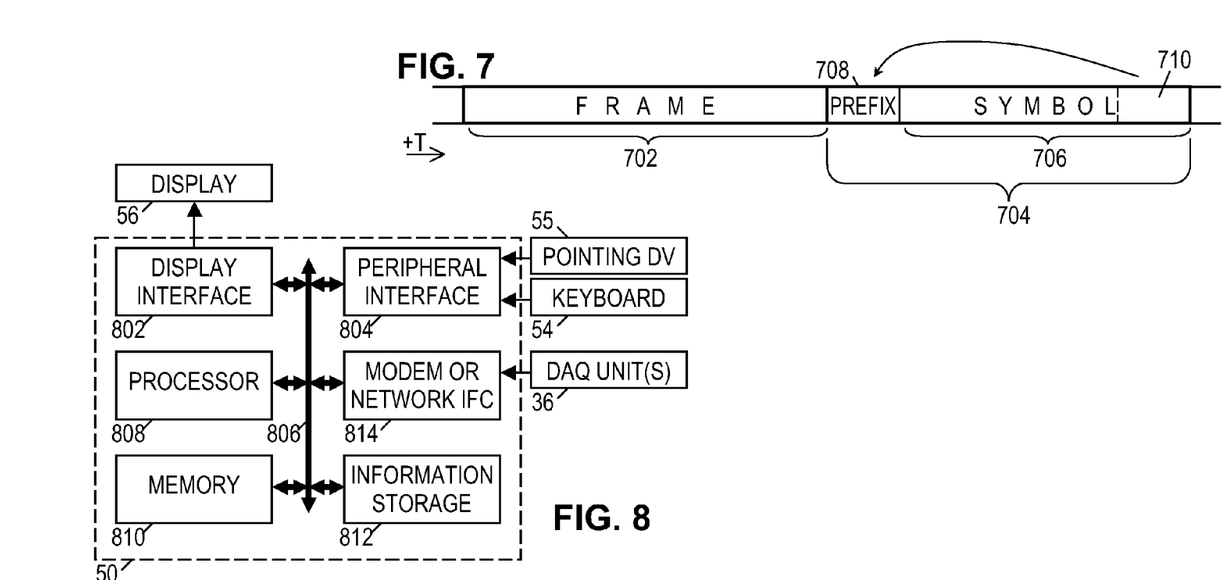
FIG. 7 shows an illustrative frame structure for OFDM signaling.
FIG. 8 is a block diagram of an illustrative signal processing system.

FIG. 7 shows an illustrative frame structure for OFDM signaling. In interpreting FIG. 7, the data is assumed to be transmitter in order from left to right, so that frame 702 precedes frame 704 through the channel. As shown in FIG. 7, each frame includes a symbol 706 that is preceded by a cyclic prefix 708. Prefix 708 is a replica of the trailing portion 710 of symbol 706, so that the effect of the channel response on frame 704 will appear similar to circular convolution of the channel response with symbol 706. In the contemplated embodiment discussed above, the symbol is one second long, with a 0.25 second cyclic prefix. It is recognized, however, that the channel supports different symbol lengths and different prefix lengths. In particular, the use of suitable equalization in the receiver may in some cases reduce the required length of a cyclic prefix.

Turning next to a discussion of the receiving end of an EM telemetry system, FIG. 8 shows a block diagram of an illustrative signal processing system 50 suitable for receiving and demodulating the uplink signal. System 50 includes a display interface 802, a peripheral interface 804, a bus 806, a processor 808, a memory 810, an information storage device 812, and a network interface 814. The display interface 802 may take the form of a video card or other suitable interface that accepts information from the bus 806 and transforms it into a form suitable for display 56. Conversely, the peripheral interface may accept signals from input devices 54, 55 and transform them into a form suitable for communication on bus 806. Bus 806 interconnects the various elements of the computer and transports their communications.

Processor 808 gathers information from the other system elements, including input data from the peripheral interface 804 and program instructions and other data from the memory 810, the information storage device 812, or from a remote location via the network interface 814. (The network interface 814 enables the processor 808 to communicate with remote systems via a wired or wireless network. In FIG. 8, the network interface 814 is shown connected to the data acquisition unit 36 to receive a digitized version of the received uplink signal.) The processor 808 carries out the program instructions and processes the data accordingly. The program instructions may further configure the processor 808 to send data to other system elements, including information for the user, which can be communicated via the display interface 802 and the display 56.

The processor 808, and hence the computer as a whole, generally operates in accordance with one or more programs stored on an information storage device 812. One or more of the information storage devices may store programs and data on removable storage media such as a floppy disk or an optical disc. Whether or not the information storage media is removable, the processor 808 may copy portions of the programs into the memory 810 for faster access, and may switch between programs or carry out additional programs in response to user actuation of the input device. One or more of these programs configures the computer to carry out at least one of the receive signal demodulation methods disclosed herein.

Figure 9:
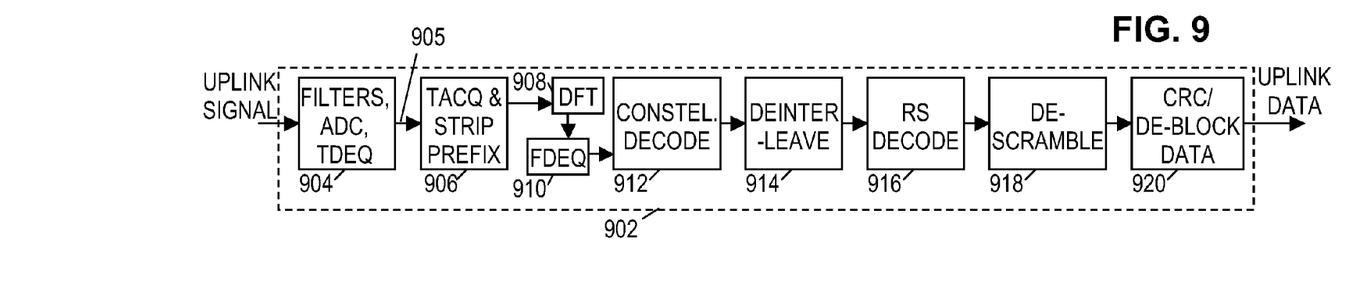
FIG. 9 is a block diagram of an illustrative OFDM receiver.

FIG. 9 is a block diagram of an illustrative OFDM receiver 902. In at least some embodiments, many of the blocks represent operations carried out on a computer like data processing system 50. The blocks shown include a digitization module 904, a timing acquisition module 906 with cyclic prefix stripping logic, a discrete Fourier transform module 908, a frequency domain equalizer 910, a constellation decoder 912, a deinterleaver 914, a Reed Solomon decoder 916 (or decoder for another suitable error correcting code), a descrambler 918, and a CRC verification/de-blocking module 920. Digitization module 904 includes a bandpass filter, an analog-to-digital converter ("ADC"), and time-domain equalizer to convert the analog uplink signal into a digital receive signal 905. These and other functions (e.g., beam-forming, oversampling, factionally-spaced equalization, decimation) can be performed by data acquisition unit 36, which can then communicate the signal to data processing system 50 for further processing. In at least some embodiments, system 50 buffers the digital receive signal in memory for the processing operations discussed below, thereby enabling some of the operations to be conducted multiple times with different parameters if desired.

Timing acquisition module 906 analyzes the buffered receive signal to identify the start of each symbol. With the start positions identified, the symbols can be extracted from the receive signal and provided to discrete Fourier transform (DFT) module 908. DFT module 908 converts the symbol into frequency coefficients. Frequency domain equalizer 910 then applies an equalization mask to the frequency coefficients to compensate for residual channel effects. The frequency domain equalization can be accomplished by using one complex multiply for each frequency coefficient.

After demodulation and equalization, the bit values for each frequency bin are individually decoded by constellation decoder 912. The de-interleaver 914 then reorders the data back into Reed-Solomon code words for processing by decoder 916. The Reed-Solomon ("RS") decoder 916 detects and corrects bit errors with the aid of redundancy added by the RS encoder 408 in the transmitter (FIG. 4). The descrambler 918 then inverts the data scrambling operation performed by the scrambler 406. Module 920 then uses the CRC data generated by the transmitter's CRC module 404 to identify any symbols or symbol groups that contained an error uncorrectable by the RS encoder/decoder blocks and, assuming there are no such errors, module 920 extracts the original data bits and stores the data in memory buffers for subsequent use. Such subsequent use may include processing to determine the downhole tool measurements represented by the data bits and display the relevant data in suitable form to a user.

Returning now to block 906, FIG. 10 shows a flow diagram of an illustrative symbol synchronization method, which the processing system 50 can carry out on digital receive signal 905. In at least some system embodiments, the received signal has a small bandwidth (approximately 10 Hz), and accordingly, the digital receive signal 905 may be heavily oversampled (e.g., at 100 Hz, or even at 1 kHz) without straining the system's capabilities. The digital receive signal 905 may be buffered or stored indefinitely, thereby enabling the timing acquisition operation to be carried out for the buffered or stored signal before demodulation is attempted. An illustrative receive signal 122 is shown in FIG. 11, with symbol boundary markers 124. (The superimposed timing recovery signal 126 is shown in more detail in FIG. 14).

Figure 10:
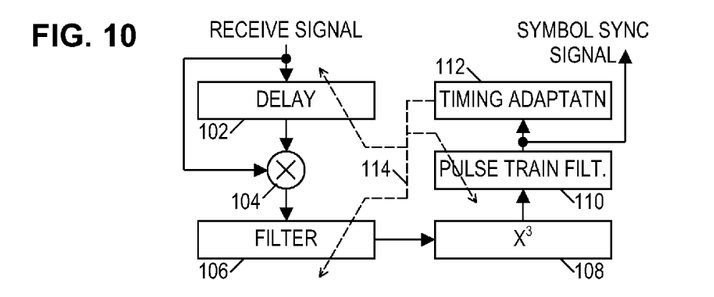
FIG. 10 is a flow diagram of an illustrative symbol synchronization method.
Figure 11:
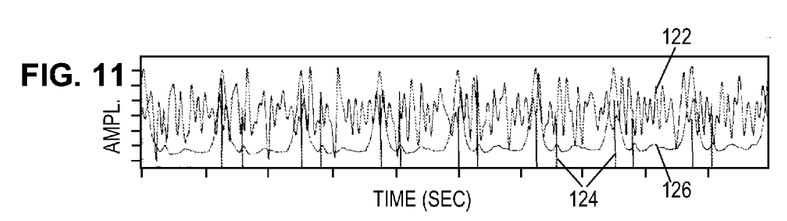
FIG. 11 is a graph of an illustrative OFDM signal.

Block 102 in FIG. 10 represents a one-symbol delay, so that multiplier 104 is multiplying the receive signal with a delayed version of itself. In a contemplated system having 1 kHz sampling of a receive signal having 1.25 second frames (1 second symbols with a 0.25 second cyclic prefix), the delay element 102 represents approximately a 1000-sample offset in the signals being retrieved from memory. As discussed further below, the offset can be adjusted to account for clock rate differences between the transmitter and receiver.

Multiplier 104 provides a product signal to a filter 106, which can be a moving average ("MA") filter that sums or averages the product signal within a moving 0.25 second window (the length of the cyclic prefix). In the contemplated system, the window length is approximately 250 samples. Again, as discussed further below, the window length can be adjusted to account for clock rate differences between the transmitter and receiver. In an alternative embodiment, filter 106 is a autoregressive ("AR") filter having an "exponential decay" impulse response, or a slightly more complex autoregressive moving-average (ARMA) filter designed to convert the product signal into an estimate of the cross-correlation between the receive signal and its delayed version.

Figure 12:
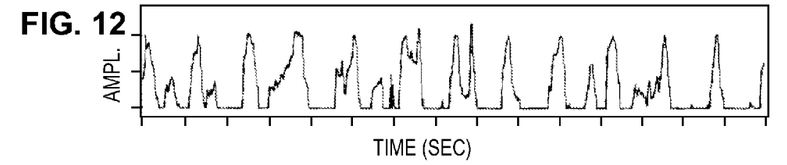
FIG. 12 is a graph of an illustrative correlation signal.

The filter 106 produces a correlation signal that, in theory, provides a peak when the cyclic prefix is correlated with the last portion of the frame. Shaping module 108 cubes the correlation signal to "sharpen" the peak, normally making it easier to precisely identify the beginning of each symbol. Unfortunately, in the bandwidth-constrained system being currently contemplated, the cubed correlation signal peaks can be poorly defined as illustrated in FIG. 12. Moreover, the cubed correlation signal occasionally includes a spurious peak that could cause a loss in symbol synchronization.

Figure 13:
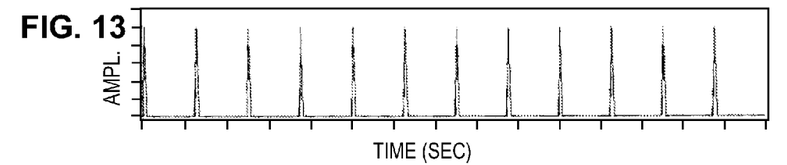
FIG. 13 is a graph of an illustrative impulse response for a pulse train filter.

Accordingly, the symbol synchronization method of FIG. 10 includes a pulse train filter 110, so called because it has an impulse response consisting of a series of evenly-spaced pulses as shown in FIG. 13. The pulses are shifted from one another by 1.25 seconds (one frame), which in the contemplated embodiment is approximately 1250 samples. The spacing can be adaptively adjusted to account for clock rate differences between the transmitter and receiver. In the contemplated embodiment, the width of each pulse is about 0.051 seconds, or about 51 samples. Various suitable pulse shapes can be used, including well-known window filter shapes such as rectangular, triangular, Hanning, Hamming, or Blackman windows. (See, e.g., Oppenheim & Schafer, Discrete-Time Signal Processing, ©1989, p. 447 et seq.) The illustrative impulse response in FIG. 13 uses a sequence of twelve triangular pulses, a configuration that can be adjusted as needed. It is expected that it would be desirable to have at least eight pulses.

Figure 14:
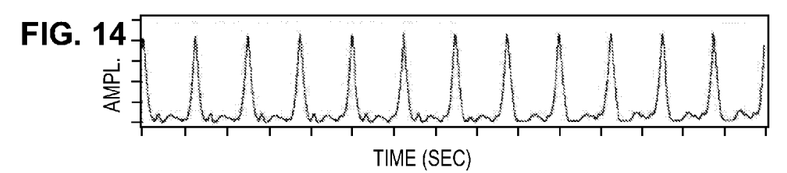
FIG. 14 is a graph of a symbol synchronization signal.

FIG. 14 illustrates the symbol synchronization signal output by pulse train filter 110. This signal represents the convolution of the pulse train impulse response (FIG. 13) with the cubed correlation signal (FIG. 12). It can be readily observed that the symbol synchronization signal provides well-behaved peaks that accurately indicate the symbol boundaries. In FIG. 11, the sync signal 126 is overlaid on the received signal 122 to show that the peaks align with the beginning of each frame. We note that the pulse train impulse response can be time-shifted to provide alignment between the synchronization signal peaks and any desired portion of the receive signal, including e.g. the beginning of each symbol. In any event, the fixed nature of the frame structure enables straightforward identification of each portion of the frame once any given boundary has been identified.

Returning to FIG. 10, the height of the peaks in the symbol sync signal is a function of the misalignment between the transmitter and receiver clock rates. Timing adaptation module 112 provides a timing adjustment signal to blocks 102, 106, and 110, which adjust their relevant delays (sample spacing) and/or window lengths in proportion to the adjustment signal. The timing adaptation module 112 additionally tracks the peak height as a function of the timing adjustment signal, and sets the adjustment signal to the value that maximizes the average peak height. This adjustment can be performed adaptively, or in the contemplated embodiments, the method of FIG. 10 is simply repeated with different timing adjustment values, and the optimum value is selected for use with subsequent demodulation steps.

Note that the sequence of operations in FIG. 10 is not critical. For example, the pulse train filter 1110 may be combined with the moving average filter 106 or may immediately follow it. The shaping module 108 may follow the pulse train filter 110 or may be omitted altogether.

Numerous variations and modifications will become apparent to those skilled in the art once the above disclosure is fully appreciated. For example, the foregoing systems and methods can be used to support OFDM modulated signal communication using sub-Hertz frequency bin widths, e.g., 0.1 Hz. The functionality of data processing system 50 can be carried out by a digital signal processor chip or by application specific integrated circuitry. It is intended that the following claims be interpreted to embrace all such variations and modifications.

What is claimed is:

1. A low bandwidth orthogonal frequency division multiplexing (OFDM) receiver that comprises:
   an analog to digital converter that transforms an analog receive signal into a digital receive signal comprising a plurality of frames, each frame having a symbol and a cyclic prefix; and
   a timing acquisition module that provides a synchronization signal to demarcate symbol boundaries,
   wherein the timing acquisition module includes a multi-frame pulse train filter coupled to the output of a multiplier that multiplies the digital receive signal with a delayed version of the digital receive signal.

2. The receiver of claim 1, further comprising:
   a discrete Fourier transform module that converts demarcated symbols into frequency coefficients;
   a constellation decoder that converts the frequency coefficients into a stream of data bits; and
   one or more modules to determine downhole measurements represented by the stream of data bits and to display at least one of said measurements to a user.

3. The receiver of claim 1, wherein the pulse train filter has an impulse response characterized by a sequence of at least eight pulses offset from each other by one frame period.

4. The receiver of claim 3, wherein the pulse train filter has an impulse response characterized by a sequence of at least twelve pulses.

5. The receiver of claim 3, wherein said pulses are triangular, with a pulse width approximately equal to 20% of a cyclic prefix length.

6. The receiver of claim 3, wherein the timing acquisition module includes a timing adaptation module that adjusts said frame period to account for a clock rate difference relative to a transmitter clock rate.

7. The receiver of claim 6, wherein the analog receive signal carries data in multiple frequency bins each having a width of no more than one hertz.

8. The receiver of claim 1, wherein the timing acquisition module further comprises a shaping module coupled between the multiplier and the pulse train filter.

9. A downhole electromagnetic (EM) telemetry system that comprises:
   a downhole transmitter coupled to a downhole antenna to transmit measurement data in an orthogonal frequency division multiplexing (OFDM) modulated EM signal; and
   a data processing system coupled to a receive antenna and an analog to digital converter that transforms an analog receive signal into a digital receive signal,
   wherein the data processing system obtains and processes the digital receive signal to extract said measurement data, wherein the receive signal comprises a plurality of frames, each frame having a symbol and a cyclic prefix,
   wherein the data processing system includes a timing acquisition module that employs a multi-frame pulse train filter to generate a symbol synchronization signal to demarcate symbol boundaries, the pulse train filter operating on an output of a multiplier that multiplies the digital receive signal with a delayed version of the digital receive signal.

10. The telemetry system of claim 9, wherein the data processing system further includes:
    a discrete Fourier transform module that converts symbols into frequency coefficients;
    a constellation decoder that converts the frequency coefficients into a stream of data bits; and
    one or more modules to determine the measurement data represented by the stream of data bits and to display at least some of said measurement data to a user.

11. The telemetry system of claim 9, wherein the pulse train filter has an impulse response characterized by a sequence of at least eight pulses offset from each other by one frame period.

12. The telemetry system of claim 11, wherein the pulse train filter has an impulse response characterized by a sequence of at least twelve pulses.

13. The telemetry system of claim 11, wherein said pulses are triangular.

14. The telemetry system of claim 11, wherein the timing acquisition module includes a timing adaptation module that adjusts said frame period to account for a clock rate difference relative to the downhole transmitter's clock rate.

15. The telemetry system of claim 14, wherein the analog receive signal carries data in multiple frequency bins each having a width of no more than one hertz.

16. The telemetry system of claim 9, wherein the timing acquisition module further comprises a shaping module that provides the pulse train filter with a cubed correlation signal.

17. Software instructions on a non-transitory computer-usable medium where the instructions, when executed, effect an orthogonal frequency division multiplexing (OFDM) receiver, the software instructions comprising:
    a timing acquisition module that obtains a receive signal comprising a plurality of frames, each frame having a symbol and a cyclic prefix, wherein the timing acquisition module correlates the receive signal with a delayed version of the receive signal, and applies a multi-frame pulse train filter to generate a symbol synchronization signal that demarcates symbols in the receive signal;
    a discrete Fourier transform module that converts each of a sequence of demarcated symbols into corresponding sets of frequency coefficients;
    a constellation decoder module that converts each set of frequency coefficients into a set of encoded data bits; and
    one or more subsequent modules that decode the encoded data bits to obtain measurement data and provide measurement data to a user.

18. The medium of claim 17, wherein the pulse train filter has an impulse response characterized by a sequence of at least twelve pulses offset from each other by one frame period.

19. The medium of claim 18, wherein the timing acquisition module adjusts said frame period to match a frame period of the receive signal.

20. The medium of claim 17, wherein the pulse train filter has an impulse response characterized by a sequence of at triangular pulses, each having a width of less than 25% of a cyclic prefix length.

\* \* \* \* \*